United States Patent
Haas et al.

(10) Patent No.: US 6,638,990 B2
(45) Date of Patent: Oct. 28, 2003

(54) FLAME-LAMINABLE POLYURETHANE FOAMS

(75) Inventors: Peter Haas, Haan (DE); Matthäus Gossner, Köln (DE); Klaus-Peter Herzog, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/056,883

(22) Filed: Jan. 25, 2002

(65) Prior Publication Data

US 2002/0098338 A1 Jul. 25, 2002

Related U.S. Application Data

(63) Continuation of application No. 09/732,389, filed on Dec. 7, 2000.

(30) Foreign Application Priority Data

Dec. 17, 1999 (DE) .......................... 199 61 417

(51) Int. Cl.[7] .............................................. C08G 18/48
(52) U.S. Cl. ...................... 521/174; 521/130; 521/159; 521/170; 521/172; 521/173; 428/423.1
(58) Field of Search ................. 521/170, 174, 521/172, 173, 159, 130; 428/423.1

(56) References Cited

U.S. PATENT DOCUMENTS

| | | | | | |
|---|---|---|---|---|---|
| 5,120,770 | A | * | 6/1992 | Doyle et al. | 521/110 |
| 5,237,036 | A | * | 8/1993 | Spitzer | 528/67 |
| 5,254,597 | A | * | 10/1993 | Horn et al. | 521/51 |
| 5,428,077 | A | * | 6/1995 | Lamberts et al. | 521/131 |
| 6,284,812 | B1 | * | 9/2001 | Rotermund et al. | 521/131 |

FOREIGN PATENT DOCUMENTS

| | | |
|---|---|---|
| EP | 428737 | 5/1991 |
| WO | 96/37533 | 11/1996 |

OTHER PUBLICATIONS

Patent Abstracts of Japan, vol. 016, No. 249 (C–0948), Jun. 8, 1992, & JP 04 055420 A (Dainippon Ink & Chem Inc), Feb. 24, 1992.

* cited by examiner

*Primary Examiner*—John M. Cooney, Jr.
(74) *Attorney, Agent, or Firm*—Joseph C. Gil; N. Denise Brown

(57) ABSTRACT

This invention relates to flame-laminable polyurethane block foams having high peel strength, a process for their production and the use thereof for textile lamination.

2 Claims, No Drawings

FLAME-LAMINABLE POLYURETHANE FOAMS

This application is a Continuation of U.S. Ser. No. 09/732,389 filed Dec. 7, 2000.

BACKGROUND OF THE INVENTION

This invention relates to polyurethane flexible block foams which are flame-laminable and have high peel strength, a process for their production and the use thereof for textile lamination.

Webs of foam produced from polyurethane foam blocks by cutting processes are often used for lamination with many different kinds of textiles for various applications. This is carried out by a bonding or surface melting process, such as flame lamination. Due to their particular suitability, polyester-polyurethane foams are typically used for conventional flame lamination. The ester groups in the polyol component result in a good hot-melting behavior with optimal setting behavior; and the foams exhibit an exceptionally strong bonding to textiles. Such polyester-polyurethane foam/textile laminates have peel strengths of 18 to 22 N, in accordance with DIN 53 357. Moreover, they exhibit elongations at break of about 300% and tensile strengths of about 200 kPa, and accordingly, permit high laminating speeds. Furthermore, at certain bulk densities such polyester foams are self-extinguishing in accordance with FMVSS 302 (SE). Therefore, polyester foams are mainly used as foamed-plastic film for the lamination process. However, their fogging behavior in accordance with DIN 75 201 is unfavorable. This is due to the method of production of the polyester polyols which results in the presence of fogging-active low-molecular components in the polyester polyols. They also have a high proportion of closed cellular structures.

An alternative is the use of polyether foams. These, however, do not have a satisfactory laminability. Various methods of increasing the laminability of polyether foams have been proposed.

Thus, in EP-A 25 549, the addition of neopentyl glycol hydroxypivalate ester during the production of the foam is proposed. This results in good laminability and a good high-frequency weldability, but high values for the compression set are obtained even at bulk densities which are relatively high for ether foams.

EP-A 35 687 discloses the use of solutions of reaction products of diisocyanates with diprimary diols in high-molecular polyethers having mainly secondary hydroxyl groups for the production of flame-laminable foams. However, the foams thus obtained are not resistant to aging. Thus, for example, a poorer recovery after continuous stress is found. These disadvantages are even more marked at lower bulk densities and when flameproofing agents are added in order to achieve self-extinguishing properties.

U.S. Pat. Nos. 5,891,928 and 5,900,087 describe the addition of aliphatic diols or polymeric diols to polyether foam formulations in order to improve the flame laminability. However, the resulting peel strengths of the laminated parts, at 8 to 14 N, are significantly less than those of the laminated polyester foams, which attain values of 18 to 22 N. Experience shows that a peel strength of approximately 16 N is required for a good adhesion.

It has now been found that, the addition of aromatically modified glycols or aromatically modified ether glycols, it is possible to produce flame-laminable ether foams whose peel strength, tensile strength and elongation at break are comparable with those of polyester foams, and which moreover exhibit the favorable aging and fogging behavior of polyether foams. This is true even in the case of foams which have been made self-extinguishing in compliance with FMVSS 302.

SUMMARY OF THE INVENTION

The invention provides flame-laminable polyether-polyurethane foams, which comprise the reaction product of:
A) at least one polyisocyanate or polyisocyanate prepolymer; with
B) at least one polyether polyol having a functionality of 2 to 6 and a number average molecular weight of 1,000 to 10,000 g/mole;
C) optionally, one or more aliphatic chain extenders having a molecular weight of 62 to 800;
D) at least one aromatic polyol component that is at least bifunctional;
E) a blowing agent comprising water, and optionally, $CO_2$, which is preferably present in liquid form, and/or other organic blowing agents;
F) optionally, one or more stabilizers;
G) optionally, one or more activators; and
H) optionally, one or more flameproofing agents and other additives.

The aromatic polyol components that are at least bifunctional, i.e. component D) above, result in flame-laminable polyether polyurethane foams.

The present invention also relates to a process for the production of a flame-laminable polyether-polyurethane foam. This process comprises reacting:
A) at least one polyisocyanate or polyisocyanate prepolymer; with
B) at least one polyether polyol having a functionality of 2 to 6 and a number average molecular weight of 1,000 to 10,000 g/mole;
C) optionally, one or more aliphatic chain extenders having a molecular weight of 62 to 800;
D) at least one aromatic polyol component that is at least bifunctional;
E) a blowing agent comprising water, and optionally, $CO_2$, which is preferably present in liquid form, and/or other organic blowing agents;
F) optionally, one or more stabilizers;
G) optionally, one or more activators; and
H) optionally, one or more flameproofing agents and other additives.

The present invention also relates to a process for the production of a composite material comprising laminating a layer of polyether-polyurethane foam with a textile layer.

In the process according to the present invention, organic di- or polyisocyanates or polyisocyanate prepolymers are suitable for component A). Suitable di- or polyisocyanates include, for example, aliphatic, cycloaliphatic, araliphatic, aromatic and heterocyclic polyisocyanates, such as are described in Justus Liebigs Annalen der Chemie, 562 (1949) 75, for example, those corresponding to the formula:

wherein:
n represents an integer from 2 to 4, preferably 2, and
Q represents an aliphatic hydrocarbon group having 2 to 18 carbon atoms, preferably 6 to 10 carbon atoms, a cycloaliphatic hydrocarbon group having 4 to 15 carbon atoms, preferably 5 to 10 carbon atoms, an aromatic hydrocarbon group having 6 to 15 carbon atoms, preferably 6 to 13 carbon atoms, or an araliphatic hydrocarbon group having 8 to 15 carbon atoms, preferably 8 to 13 C atoms.

Polyisocyanates of the type described in U.S. Pat. No. 4,263,408, the disclosure of which is herein incorporated by reference, are preferred. As a rule, the technically readily accessible polyisocyanates are particularly preferred such as, for example, 2,4-and 2,6-tolylene diisocyanate as well any mixtures of these isomers ("TDI"), polyphenyl polymethylene polyisocyanates, as produced by aniline-formaldehyde condensation and subsequent phosgenation ("crude MDI"), and polyisocyanates containing carbodiimide groups, urethane groups, allophanate groups, isocyanurate groups, urea groups or biuret groups ("modified polyisocyanates"), in particular those modified polyisocyanates which are derived from 2,4- and/or 2,6-tolylene diisocyanate or from 4,4'- and/or 2,4'-diphenylmethane diisocyanate. Prepolymers of the above-mentioned isocyanates and organic compounds having at least one hydroxyl group may also be used. Examples of compounds having at least one hydroxyl groups which may be given are polyols or polyesters having one to four hydroxyl groups and (number average) molecular weights of 60 to 1,400. Most preferably used are the technically obtainable polyisocyanates by the name of "polymeric diphenylmethane diisocyanate", having a functionality of higher than 2.0, as well as prepolymers produced from them.

In accordance with the present invention, polyol component B) comprises at least one polyether polyol (i.e. a poly(oxyalkylene) polyol) having a functionality of from about 2 to about 6 and a number average molecular weight of from about 1,000 to about 10,000 g/mole. Mixtures of such polyols may also be used as component B).

The poly(oxyalkylene) polyols sutiable for the present invention include those which can be prepared by, for example, the polyaddition of one or more alkylene oxides to one or more polyfunctional starter compounds in the presence of one or more basic catalysts. Preferred starter compounds include those molecules having from about two to about six hydroxyl groups per molecule such as, for example, water, triethanolamine, 1,2-ethanediol, 1,2-propanediol, 1,3-propanediol, diethylene glycol, dipropylene glycol, triethylene glycol, tripropylene glycol, 1,2-butanediol, 1,3-butanediol, 1,4-butanediol, 1,2-hexanediol, 1,3-hexanediol, 1,4-hexanediol, 1,5-hexanediol, 1,6-hexanediol, glycerol, trimethylolpropane, pentaerythritol, mannitol or sorbitol.

Other possible starter compounds for the component B) of the present invention include, for example, ammonia or compounds which have at least one primary or secondary amino group such as, for example, aliphatic amines including, for example, 1,2-diaminoethane, oligomers of 1,2-diaminoethane (for example, diethylenetriamine, triethylenetetramine or pentaethylenehexamine), ethanolamine or diethanolamine, 1,3-diaminopropane, 1,3-diaminobutane, 1,4-diaminobutane, 1,2-diaminohexane, 1,3-diaminohexane, 1,4-diaminohexane, 1,5-diaminohexane, 1,6-diaminohexane, aromatic amines such as 1,2-diaminobenzene, 1,3-diaminobenzene, 1,4-diaminobenzene, 2,3-diaminotoluene, 2,4-diaminotoluene, 3,4-diaminotoluene, 2,5-diaminotoluene, 2,6-diaminotoluene, 2,2'-diaminodiphenylmethane, 2,4'-diaminodiphenylmethane, 4,4'-diaminodiphenylmethane or aromatic amines which are obtained by acid-catalyzed condensation of aniline with formaldehyde. These starter compounds may be used alone or as a mixture.

Alkylene oxides preferably used for the preparation of the poly(oxyalkylene)polyols in accordance with the invention include oxirane, methyloxirane and ethyloxirane. These alkylene oxides may be used alone or as a mixture. When used as a mixture, the alkylene oxides can be reacted statistically or blockwise or both in succession. Further details may be found in "Ullmanns Encyclopädie der industriellen Chemie", Volume A21, 1992, p. 670 ff.

Other suitable poly(oxyalkylene) polyols to be used as component B) of the present invention include, for example, dispersions of a grafted polymerization product in a poly(oxyalkylene) polyol according to the invention. This polymerization product can be prepared, for example, by free-radical in-situ polymerization of, for example, acrylonitrile and/or styrene in a poly(oxyalkylene) polyol in accordance with the method described in, for example, U.S. Pat. No. 3,523,093, the disclosure of which is herein incorporated by reference. Other suitable polymerization products include, for example, polyurethanes containing tertiary amino-groups, polyurea compounds or polyhydrazides. Suitable methods for preparing dispersions of these polymerization products are described in, for example, U.S. Pat. No. 4,304, 708 and U.S. Pat. No. 4,374,209, the disclosures of which are herein incorporated by reference, and DE-OS 32 31 497. The proportion of the polymeriszation products in the dispersion is preferably 1 to 50 wt. %.

Further examples of suitable polyols which can be contained in the polyol component B) include polyfunctional alcohols, amines, amino alcohols, or mixtures of these, as well as their oxypropylated and/or oxyethylated derivative products.

Suitable compounds to be used as component C) the chain extender, include, for example, those aliphatic organic compounds having a molecular weight ($M_n$) of 62 to 800 g/mole such as, for example, glycerol, glycols, sorbitol and alkanolamines.

In accordance with the present invention, low molecular weight aromatic polyols which are at least bifunctional are used as flame lamination additives, i.e. component D). Suitable aromatic compounds for component D) include both aromatic polyester polyols and aromatic polyether polyols. These aromatic polyols, besides containing a relatively short-chain aliphatic ether portion, preferably also have aromatically bonded ester or ether groupings. If aromatic polyether polyols are used, these preferably have a number average molecular weight of from about 150 to about 999 g/mole, and more preferably from about 150 to about 700 g/mole. Suitable polyester polyols preferably have number average molecular weights of from about 150 to about 1,200 g/mole, and more preferably from about 150 to about 1,000 g/mole.

Some examples of suitable aromatic polyester polyols include those compounds composed of at least bifunctional aromatic dicarboxylic acids such as phthalic acid, terephthalic acid, isophthalic acid or even higher functional carboxylic acids such as trimellitic acid, trimesic acid, the carboxyl groups of which are esterified with glycols such as ethylene glycol, propylene glycol, diethylene glycol, dipropylene glycol, tripropylene glycol, triethylene glycol, higher homologues of these glycols, butylene glycol, or higher functional alcohols such as, for example, glycerol or trimethylolpropane. Aromatic polyester polyols having at least two OH groups and an ester group and an extended phenolic OH group can also be used. Examples of such compounds include 4-(2-hydroxyethoxy)benzoic acid, 2-hydroxyethyl ester or 4-(2-hydroxyethoxy)benzoic acid, 2-hydroxyethoxyethyl ester.

Suitable aromatic polyether polyols include those compounds which are prepared by, for example, the alkoxylation of at least bifunctional aromatic phenol derivatives such as, for example, 2,2-bis(4-hydroxy-phenyl)propane, hydroquinone, dihydroxynaphthalene, catecol, resorcinol, dihydroxybiphenyl, bis(hydroxyphenyl)methane, dihydroxydiphenyl ether, hydroxymethylbenzyl alcohol, by means of alkylene oxides such as, for example, ethylene oxide, propylene oxide or butylene oxide, by the method known in principle to the person skilled in the art.

These flame lamination additives, i.e. component D), are preferably used in quantities of from about 1 to about 20% by wt., based on the combined weight of the components B) and C).

In accordance with the present invention, component E) the blowing agent(s) comprises water. Preferably, water is used as a chemical blowing agent which, by reaction with isocyanate groups, delivers carbon dioxide as fuel gas. Water is preferably present in a quantity of from about 1.0 to about 6.0% by wt., preferably from about 1.5 to about 5.5% by wt., based on the combined weight of components B), C) and D). In addition to water, component E) may also comprise one or more non-combustible physical blowing agents such as, for example, carbon dioxide, particularly in liquid form. In principle, blowing agents from the class of the hydrocarbons may also be used. Examples of such hydrocarbons include compounds such as, for example, the $C_3$–$C_6$-alkanes such as, for example, butanes, n-pentane, isopentane, cyclopentane, hexanes and the like. Also suitable are the halogenated hydrocarbons such as, for example, dichloromethane, dichloromono-fluoromethane, chlorodifluoroethane, 1,1-dichloro-2,2,2-trifluoroethane, 2,2-dichloro-2-fluoroethane, and more preferably are the chlorine-free fluorocarbons such as, for example, difluoromethane, trifluoromethane, difluoroethane, 1,1,1,2-tetrafluoroethane, tetrafluoroethane (R 134 or R 134a), 1,1,1,3,3-pentafluoropropane (R 245fa), 1,1,1,3,3,3-hexafluoropropane (R 356), 1,1,1,3,3-penta-fluorobutane (R 365mfc), heptafluoro-propane or even sulfur hexafluoride. Mixtures of these blowing agents may also be used. Other suitable blowing agents include carboxylic acids such as, for example, formic acid, acetic acid, oxalic acid, and chemical blowing agents which release gases in the course of the foaming process, such as, for example, azo compounds. These blowing agents are preferably used in combination with water.

Polyethersiloxanes, preferably water-soluble polyethersiloxanes, are primarily suitable compounds to be used as stabilizers, component F), in accordance with the present invention. These compounds are generally synthesized in such a way that one long-chain copolymer of ethylene oxide and propylene oxide is bonded to a polydimethylsiloxane group. Other suitable foam stabilizers are described in, for example, U.S. Pat. Nos. 2,834,748, 3,629,308 and 2,917,480, the disclosures of which are herein incorporated by reference.

Examples of suitable compounds to be used as activators, i.e. component G), in accordance with the present invention include tertiary amines, such as triethylamine, tributylamine, N-methylmorpholine, N-ethylmorpholine, N,N,N',N'-tetramethyl-ethylenediamine, pentamethyldiethyltriamine and higher homologues (as described in, for example, U.S. Pat. No. 4,143,003, the disclosure of which is herein incorporated by reference, and DE-A 26 24 528), 1,4-diazabicyclo-[2.2.2]octane, N-methyl-N'-dimethylaminoethylpiperazine, bis(dimethylaminoalkyl) piperazine, N,N-dimethyl-benzylamine, N,N-dimethylcyclohexylamine, N,N-diethylbenzylamine, bis(N, N-diethylaminoethyl) adipate, N,N,N',N'-tetramethyl-1,3-butanediamine, N,N-di-methyl-β-phenylethylamine, 1,2-dimethylimidazole, 2-methylimidazole, monocyclic and bicyclic amidines and bis(dialkylaminoalkyl) ethers such as, for example, 2,2-bis(dimethylaminoethyl) ether.

Organometallic compounds, in particular organotin compounds, are also suitable to be used as activators, component G) of the present invention. Besides sulfur-containing compounds such as di-n-octyltin mercaptide, preferred organotin compounds include, for example, tin(II) salts of carboxylic acids, such as, for example, tin(II) acetate, tin(II) octoate, tin(II) ethylhexoate and tin(II) laurate, and the tin (IV) compounds such as, for example, dibutyltin oxide, dibutyltin dichloride, dibutyltin diacetate, dibutyltin dilaurate, dibutyltin maleate or dioctyltin diacetate.

Compounds suitable for use as a flameproofing agents, i.e. component H) of the present invention include, for example, tricresyl phosphate, tris(2-chloroethyl) phosphate, tris(2-chloropropyl) phosphate, tris(2,3-dibromopropyl) phosphate, tetrakis(2-chloroethyl)ethylene diphosphate, dimethyl methanephosphonate, diethyl diethanolamino-methylphosphonate, tris(dipropylene glycol) phosphite, tris-(dipropylene glycol) phosphate, bis(2-hydroxyethyl) ethylene glycol diphosphate bis(2-chloroethyl) ester and halogen-containing, flameproofing polyols. Additional examples of optionally concomitantly used components fpr H) include foam stabilizers and cell regulators, reaction inhibitors, stabilizers, plasticizers, dyes and fillers as well as fungistatic and bacteriostatic substances. These are in most cases added to the polyol component in quantities of 0 to 10 parts by weight, preferably 2 to 6 parts by weight.

Details concerning the method of use and mechanism of action of these additives are given in G. Oertel (Ed.) "Kunststoff-Handbuch", Volume VII, Carl Hanser Verlag, Third edition, Munich 1993, pp. 110–115.

The foams according to the invention are generally produced by intensively mixing together the di- or polyisocyanate A) as one component, and a mixture of the remaining constituents as the other component by means of a suitable, usually mechanical, device. The foams can be produced either continuously, for instance, on a conveyor belt, or in batches. The production of flexible foams is known in principle to the person skilled in the art and is described in, for example, in G. Oertel (Ed.) "Kunststoff-Handbuch", Volume VII, Carl Hanser Verlag, Third edition, Munich 1993, pp. 193–220.

The production of foams is preferably carried out in such a way that the NCO/OH index, that is, the stoichiometric ratio of reactive isocyanate groups to hydroxyl groups, is between 0.80 and 1.20. The NCO/OH index is more preferably between 0.90 and 1.15. The bulk density of the resulting moldings is preferably 15 kg/m$^{-3}$ to 55 kg/m$^{-3}$, and more preferably 20 kg/m$^{-3}$ to 50 kg/m$^{-3}$.

The present invention also relates to textile/foam composite materials (i.e. laminates) produced using the foams according to the invention. In conventional processing, these composite materials are produced by joining together the melted layer of foam and the textile top layer. To this end, the polyether-polyurethane foams according to the invention, after a short-time flame treatment, are bonded to a textile covering made of a textile comprising, for example, polyamide, polyester, cotton or leather, to yield composites with permanent high peel strength. It is usual to apply a charmeuse protective fabric to the foam. Another method of producing the laminates of the present invention comprises bonding the foams according to the invention to the textile top layer using hot-melt adhesives by the known per se hot-melting technique, or by means of dispersion adhesives.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following components were used in the Examples:

Polyisocyanates, Component A):

Polyisocyanate A1): a mixture of 2,4- and 2,6-tolylene diisocyanate in a weight ratio of 80:20 (Desmodur® T 80, Bayer AG)

Polyisocyanate A2): a mixture of 2,4- and 2,6-tolylene diisocyanate in a weight ratio 65:35 (Desmodur® T 65, Bayer AG)

Polyether Polyols, Component B):

Polyether polyol B1): a polyether polyol having an OH number of 45 and containing mainly secondary OH groups, and being prepared by addition of propylene oxide/ethylene oxide (90/10 wt. %) to glycerol as starter.

Polyether polyol B2): a polyether polyol having an OH number of 112, and being prepared by addition of propylene oxide to propylene glycol as starter.

Polyether polyol B3): a polyether polyol having an OH number of 50 and containing about 85 mol % of primary OH groups, and being prepared by addition of propylene oxide/ethylene oxide (50/50 wt. %) to propylene glycol as starter.

Polyether polyol B4): a polyether polyol having an OH number of 45, containing mainly secondary OH groups, and containing 10 wt. % of grafted filler (i.e. styrene/acrylonitrile, 60/40 wt. %), and being prepared by addition of propylene oxide/ethylene oxide (90/10 wt. %) to glycerol as starter.

Flame Lamination Additives, Component D):

Aromatic Polyesters DI):

Aromatic polyester DI) 1): a polyester polyol being prepared by esterification of 424 g (4M) of diethylene glycol and 332 g (2M) of terephthalic acid at 150–190° C.; characterized by an OH number of 300, and having a number average molecular weight of 374 g/mol.

Aromatic polyester DI) 2): a polyester polyol being prepared by esterification of 424 g (4M) of diethylene glycol and 296 g (2M) of phthalic anhydride at 150–190° C.; characterized by an OH number of 303, and having a number average molecular weight of 370 g/mol.

Aromatic polyester DI) 3): a polyester polyol being prepared by esterification of 816 g (2M) of octaethylene glycol having an OH number of 275, and 148 g (IM) of phthalic anhydride at 150–190° C.; characterized by an OH number of 123, and a number average molecular weight of 912 g/mol.

Aromatic polyester DI) 4): a polyester polyol being prepared by esterification of 600 g (4M) of triethylene glycol having an OH number of 750, and 296 g (2M) of phthalic anhydride at 150–190° C.; characterized by an OH number of 330, and a number average molecular weight of 340 g/mol.

Aromatic Polyether Polyols DII):

Aromatic polyether DII) 1): a polyether polyol being prepared by addition of 290 g (5M) of propylene oxide to 228 g (IM) of bisphenol A; characterized by an OH number of 216, and a number average molecular weight of 519 g/mol.

Aromatic polyether DII) 2): a polyether polyol being prepared by addition of 88 g (2M) of ethylene oxide to 228 g (IM) of bisphenol A; characterized by an OH number of 355, and a number average molecular weight of 316 g/mol.

Aromatic polyether DII) 3): a polyether polyol being prepared by addition of 176 g (4M) of ethylene oxide to 228 g (1M) of bisphenol A; characterized by an OH number of 280, and a number average molecular weight of 400 g/mol.

Aromatic polyether DII) 4): a polyether polyol being prepared by addition of 88 g (2M) of ethylene oxide to 110 g (1M) of hydroquinone; characterized by an OH number of 566, and a number average molecular weight of 189 g/mol.

Aromatic polyether DII) 5): a polyether polyol being prepared by addition of 116 g (2M) of propylene oxide to 228 g (IM) of bisphenol A; characterized by an OH number of 323, and a number average molecular weight of 347 g/mol.

Production of Polyether-Polyurethane Foams:

The block foams were produced on a UBT unit (Hennecke GmbH, D-53754, St. Augustin) at a discharge rate of the raw material mixture of 30 kg/min.

Examples 1–9

In each case, the following were added to the formulation: 1.0 parts by weight of silicone stabilizer (i.e. Tegostab® B8232, commercially available from Th. Goldschmidt AG, D-45127 Essen); 0.12 parts by weight of 1,4-diazabicyclo [2.2.2]octane (i.e. Dabco® 33LV, commercially available from Air Products, GmbH, D-45527 Hattingen); 0.17 parts by weight of tin octoate; 0.1 parts by weight of a 70 wt. % solution of 2.2-Bis(dimethylaminoethyl)ether in dipropyle glycol (Niax® A1, commercially available from Witco Surfactants GmbH, D-36396 Steinau); 3.0 parts by weight of flameproofing agent (i.e. Hostaflam® 551, commercially available from Clariant International AG, CH-4132 Muttenz); 3.0 parts by weight of flameproofing agent (i.e. Amgard® V6, commercially available from Rhodia, D-63263 Neu-Isenburg).

The degree of open cells in the prepared foams was determined by the method described in, U.S. application Ser. No. 09/308,958 filed on May 27, 1999, the disclosure of which is herein incorporated by reference. The combustion behavior of the foams was determined in accordance with FMVSS 302, the compressive strength in accordance with DIN 53 577, the tensile strength and the elongation at break in accordance with DIN 53 571, the compression set in accordance with DIN 53 572, the bulk density in accordance with DIN 53 420, and the fogging value in accordance with DIN 75 201.

TABLE 1

| Example | 1 | 2 | 3 | 4 | 5 | 6 | 7* | 8* | 9 |
|---|---|---|---|---|---|---|---|---|---|
| B1) | 80 | 80 | 80 | 80 | 80 | 40 | 85 | 85 | 80 |
| B2) | 15 | 15 | 15 | — | — | — | 15 | — | — |
| B3) | — | — | — | 15 | 15 | 15 | — | 15 | 15 |
| B4) | — | — | — | — | — | 40 | — | — | — |
| D I) 2) | 5 | — | — | — | — | 5 | — | — | — |
| D I) 3) | — | 5 | — | — | — | — | — | — | — |
| D I) 4) | — | — | 5 | — | — | — | — | — | — |
| D II) 1) | — | — | — | 5 | — | — | — | — | — |
| D II) 2) | — | — | — | — | 5 | — | — | — | — |
| D II) 5) | — | — | — | — | — | — | — | — | 5 |
| Water | 3.6 | 3.6 | 3.6 | 3.6 | 3.6 | 3.6 | 3.6 | 3.6 | 3.6 |
| A1) (TDI 80) | 24.5 | 24.5 | 24.5 | 23.7 | 23.7 | 46 | 45.3 | 43.9 | 24.5 |
| A2) (TDI 65) | 24.5 | 24.5 | 24.5 | 23.7 | 23.7 | — | — | — | 24.5 |
| NCO Index | 108 | 108 | 108 | 108 | 108 | 100 | 108 | 108 | 108 |
| Bulk density [kg/m$^3$] | 27 | 28 | 29 | 28 | 27 | 28 | 28 | 28 | 28 |

*Comparison Example, not according to the invention

TABLE 2

| Example | 1 | 2 | 3 | 4 | 5 | 6 | 7* | 8* | 9 |
|---|---|---|---|---|---|---|---|---|---|
| Peel strength after lamination [N] | 18.5 | 18 | 18 | 18 | 19 | 19.5 | 11 | 12 | 19 |
| FMVSS 302 | SE | SE | SE | SE | SE | SE | SE | SE | SE |
| Degree of open cells [mm WS] | 40 | 50 | 40 | 40 | 50 | 50 | 40 | 40 | 50 |
| Compressive strength (40%) [kPa] | 3.1 | 3.0 | 3.1 | 3.0 | 3.2 | 3.5 | 3.2 | 3.2 | 3.2 |
| Tensile strength [kPa] | 160 | 150 | 140 | 140 | 140 | 150 | 160 | 150 | 160 |
| Elongation at break [%] | 370 | 380 | 370 | 360 | 370 | 370 | 310 | 320 | 370 |
| Fogging [mg] | 0.2 | 0.3 | 0.3 | 0.2 | 0.3 | 0.3 | 0.2 | 0.2 | 0.2 |
| Compression set (90%) [%] | 7 | 8 | 7 | 6 | 8 | 7 | 6 | 7 | 7 |

*Comparison Example, not according to the invention

The foams obtained were cut into webs of 50 cm in width and with a height of 7 mm and were laminated in a laboratory flame lamination unit (from the firm of Schmittmaschinen, D-63811, Stockstadt), at a flame distance of 18 mm with the adjustment "blue flame", with a feed of 40 m/min across a textile. Processed textile: passenger-car seating quality, type blue, Bändchen Blau, weight per unit area approx. 500 g/m$^2$ (Thierry Michel GmbH, D-96190 Untermerzbach).

The peel strength of the laminates obtained was determined in accordance with DIN 53 357. Examples 1–6 and 9 according to the invention exhibit peel strengths of more than 18 N, and are thus comparable with polyester foam laminates. On being separated, the foam/textile laminate invariably tears in the foam, thereby demonstrating a good level of adhesion. The high elongation at break and the tensile strength permit high laminating speeds, as are conventional in ester foams.

The compression sets of the laminates are low, even in the region of low bulk densities and even with the use of additives (flameproofing agents) which are per se plasticizing, and which promote self-extinguishment.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a composite material comprising laminating a layer of a flexible polyether-polyurethane foam with a textile or top layer, wherein said flexible polyether-polyurethane foam comprises the reaction product of:

A) at least one polyisocyanate or polyisocyanate prepolymer, with

B) at least one polyether polyol having a functionality of 2 to 6 and a number average molecular weight of 1,000 to 10,000 g/mol, C) optionally, at least one aliphatic chain extender having a molecular weight of 62 to 800, D) at least one aromatic polyol component which is at least bifunctional, wherein said aromatic polyol is selected from the group consisting of (1) one or more hydroxyl-containing esters having a number average molecular weight of 150 to 1,200 g/mol, (2) one or more hydroxyl-containing ethers having a number average molecular weight of 150 to 999 g/mol and (3) mixtures thereof, and E) at least one blowing agent comprising water, wherein the isocyanate index is from 80 to 120.

2. The textile/foam composite material produced by the process of claim 1.

* * * * *